April 24, 1951     C. H. SCHLESMAN     2,550,089
ELECTROCHEMICAL CONVERSION OF HYDROCARBONS
Filed Aug. 31, 1946     4 Sheets-Sheet 1
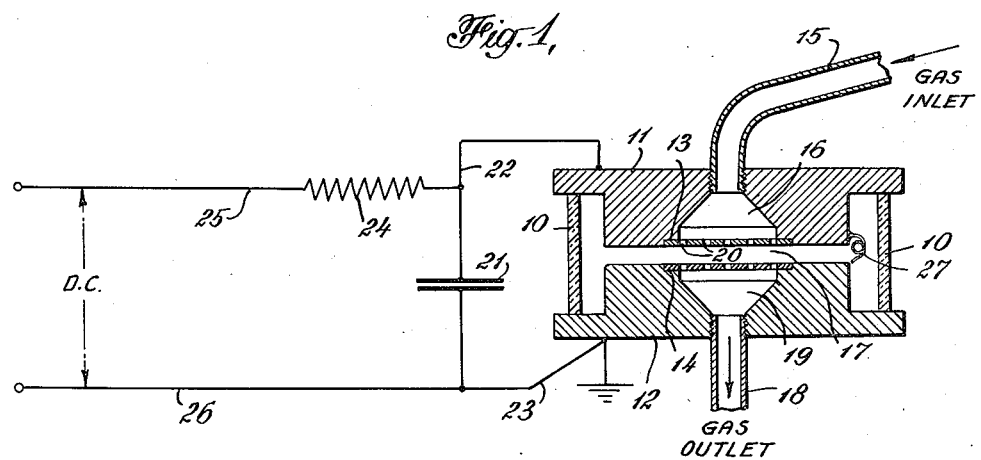
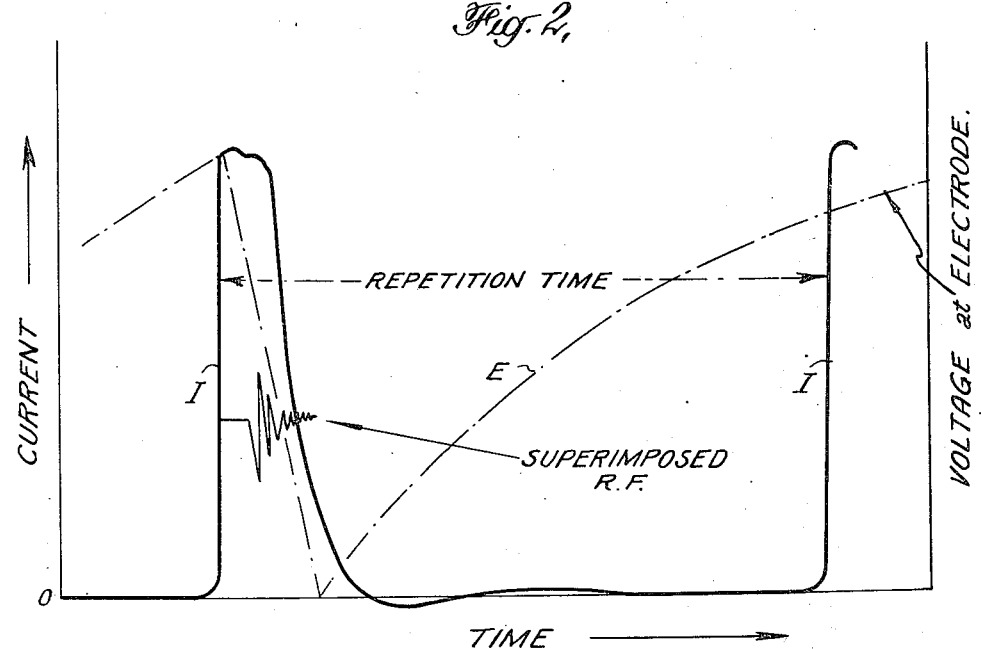
INVENTOR
CARLETON H. SCHLESMAN.
BY
ATTORNEY April 24, 1951     C. H. SCHLESMAN     2,550,089
ELECTROCHEMICAL CONVERSION OF HYDROCARBONS
Filed Aug. 31, 1946     4 Sheets-Sheet 2
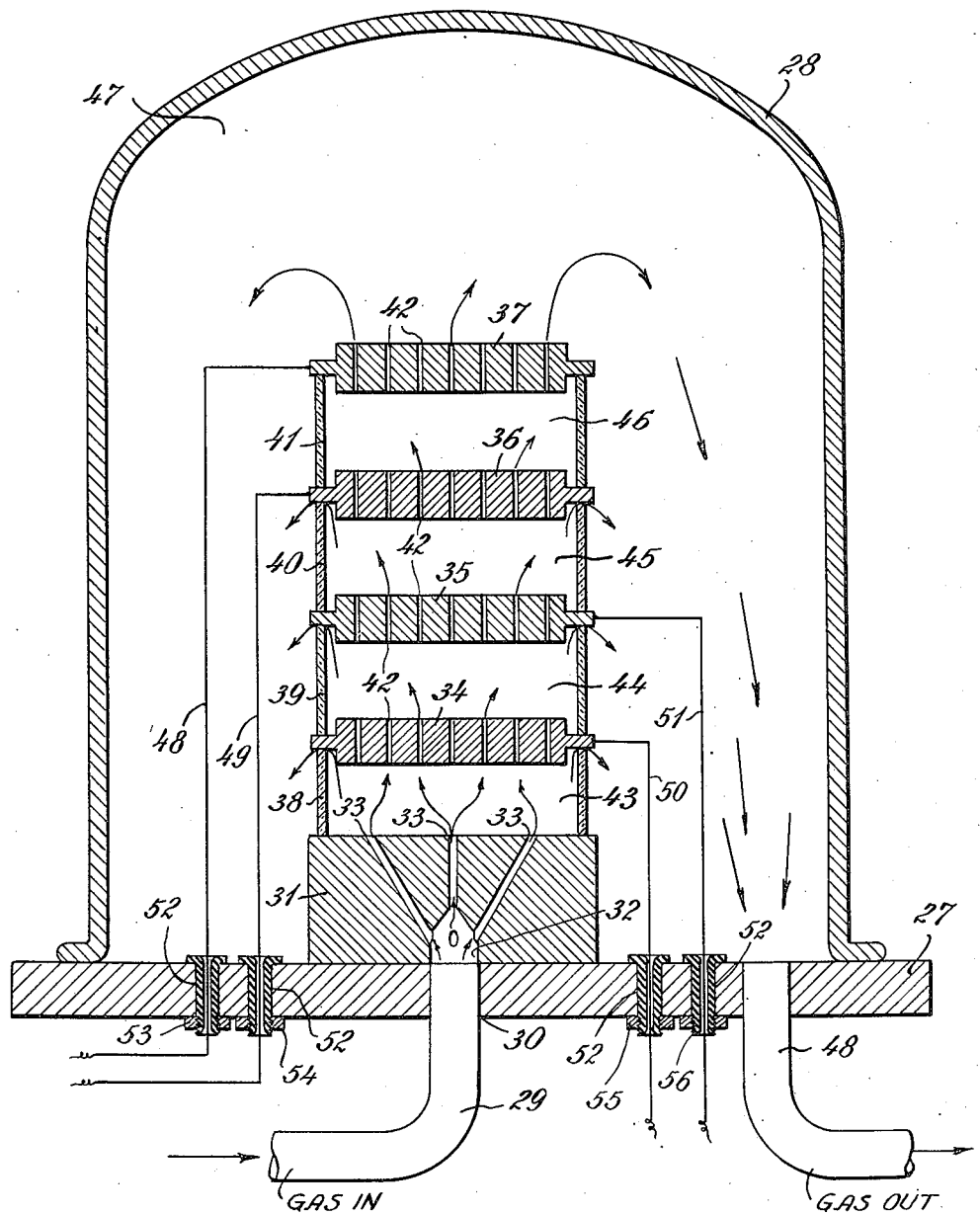
INVENTOR
CARLETON H. SCHLESMAN.
BY
ATTORNEY April 24, 1951  C. H. SCHLESMAN  2,550,089
ELECTROCHEMICAL CONVERSION OF HYDROCARBONS
Filed Aug. 31, 1946  4 Sheets-Sheet 3
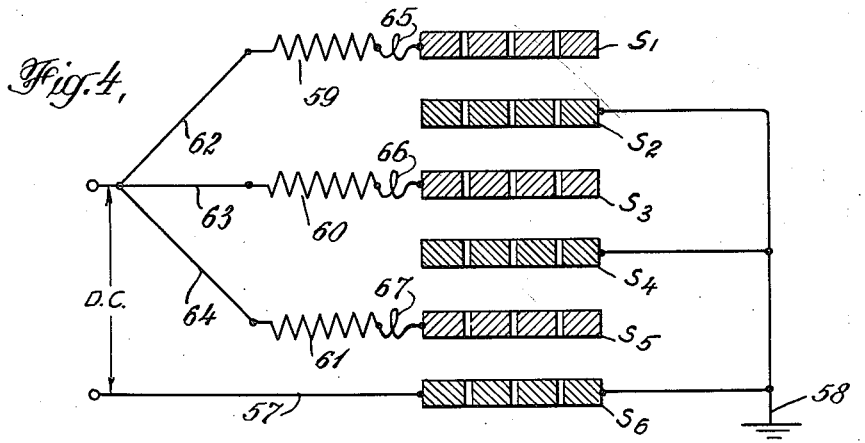
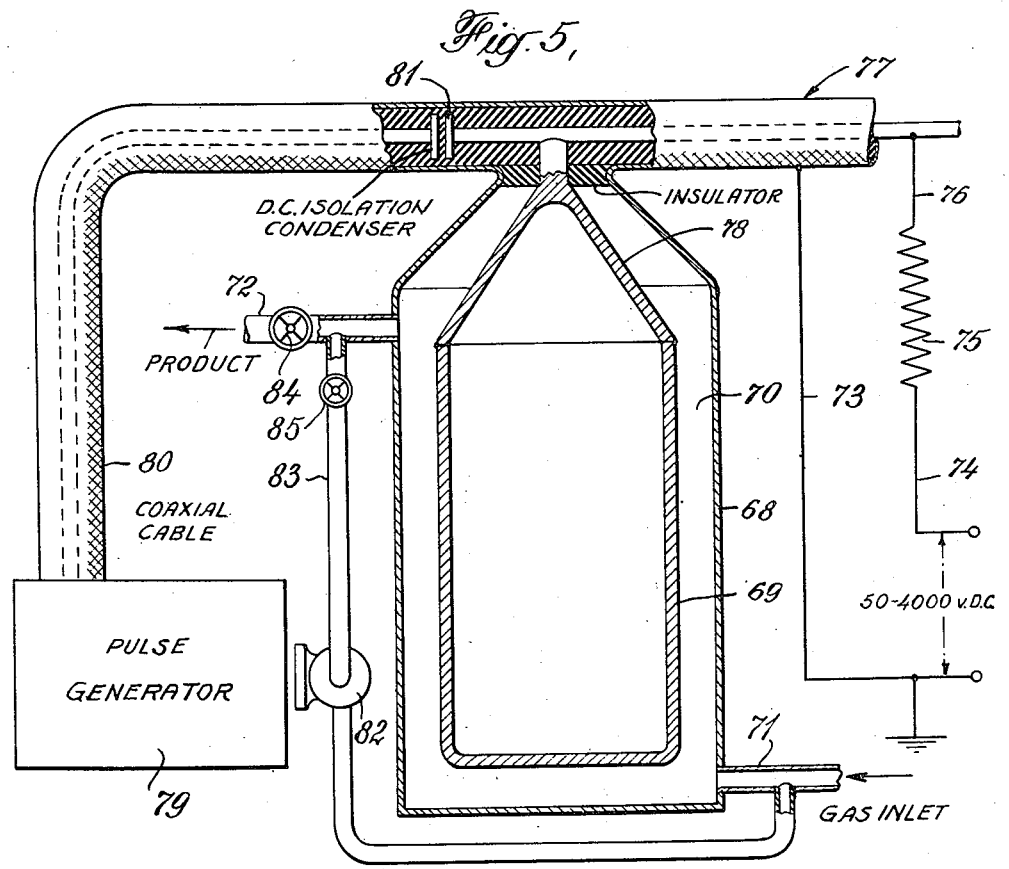
INVENTOR
CARLETON H. SCHLESMAN.
BY
James Y. Cleveland
ATTORNEY April 24, 1951     C. H. SCHLESMAN     2,550,089
ELECTROCHEMICAL CONVERSION OF HYDROCARBONS
Filed Aug. 31, 1946     4 Sheets-Sheet 4

INVENTOR
CARLETON H. SCHLESMAN.
BY
ATTORNEY

Patented Apr. 24, 1951

2,550,089

UNITED STATES PATENT OFFICE 2,550,089

ELECTROCHEMICAL CONVERSION OF HYDROCARBONS

Carleton H. Schlesman, Camden, N. J., assignor to Socony-Vacuum Oil Company, Incorporated, a corporation of New York Application August 31, 1946, Serial No. 694,387

4 Claims. (Cl. 204—171)

This invention relates to chemical reactions and more particularly to chemical reactions which are initiated, induced, accelerated, controlled or otherwise affected by the application of electrical energy to the reaction system.

The effects of heat on chemical reactions are fairly well understood. The temperature and the length of exposure of the reactants to heat are customarily controlled to obtain the desired reaction or rate of reaction. The effect of electricity on ionizable solutions is also fairly well understood. Enough is known about catalysts to make them useful for many purposes. Yet with all this knowledge there are many desirable reactions that cannot be accomplished, or cannot be efficiently accomplished.

The purpose of this invention is to provide a new process for chemical reactions, or a new driving force for chemical reactions, that will permit the accomplishment of reactions that have not heretofore been performed and the accomplishment of already known reactions with greater efficiency.

In general, the new process of chemical reaction is applicable to the reaction of compounds in a gaseous or vapor state although the principles may advantageously be applied, in some instances, to reactions between compounds in liquid or solid state or even between compounds in different states.

The pressure at which the new process may be conducted is subject to extremely wide variation dependent upon the particular reaction it is desired to accomplish and the various parameters of the system. Pressures of the order of one micron of mercury have been found desirable in some instances, while atmospheric pressure or above has been successfully used in others. Nevertheless, pressure does have an important effect and it is highly desirable that for each particular reaction a pressure be selected at which that reaction proceeds efficiently.

The temperature, in most reactions thus far conducted, has been around room temperature at the beginning of the reaction and has risen somewhat in the course of the reaction. It is to be understood, however, that the course of the reactions involved are often materially affected by temperature in the same manner as in ordinary chemical reactions and hence it is within the scope of this invention to control the temperature at the beginning, and during the course of, the reactions, either at a lower or higher level than would exist if the reactants were merely introduced at room temperature and the temperature permitted to change in whatever manner the process caused it to change.

The chemical reactions that may be performed in accordance with the principles of this invention are numerous. A few examples are:

(1) Hydrogenation or dehydrogenation of organic compounds
(2) Cracking of organic compounds
(3) Polymerization of organic compounds The principles of this invention may be applied to any chemical reaction in which the degree of control possible with this process is desirable and the course of which is susceptible to being influenced by the application of electrical energy thereto.

In many instances the reaction may be additionally assisted or side reactions lessened in known manner by the use of appropriate catalytic material. Such catalyst may, for example, be suspended in the reaction mixture or the electrodes used for applying the electrical energy may themselves be made of a catalytic material.

The new process comprises broadly the affecting of chemical reactions by the application of electrical energy and the control of the reaction by the limiting of the period or periods of application to very short lengths of time, for example, of the order of a microsecond. Thus, the electrical energy is applied in the form of one or more very short bursts or impacts or pulses. By control of and proper adjustment of the time period of the energy application, the desired reaction can be caused to occur without at the same time causing undesired secondary reactions that will destroy the desired product or form undesired by-products.

According to the principles of the present invention, it has been found that electrical energy can be applied in a novel manner to produce a new and highly desirable result. Previously, electrical energy has been supplied to reactions in a manner analogous to the usual application of heat, and which, with respect to the kinetics of the reactions involved, is essentially continuous. Thus, there was often no way of accomplishing a desired reaction and preventing an undesired one that normally accompanied it. Now electrical energy is to be supplied in one or more pulses or bursts or impacts so short in duration that the desired reaction may be completed thereby without at the same time gaving the undesired reaction a chance to complete itself. More usually, these pulses may be considered to condition the reactant or reactants for the desired reaction, but not the side reaction, and the desired reaction is then permitted to proceed in the absence, or substantial absence of the conditioning energy, or with a second electrical energy level of substantially lower intensity.

It has been found that when electrical energy is continuously applied to cause reaction and the reaction permitted to complete itself in the presence of such continuously applied energy, that the reaction often proceeds further than is desired, often produces undesired by-products and sometimes the reaction is entirely different from what is desired. When the same reactant or reactants are caused to react by one or more extremely short applications of energy, the reaction frequently follows an entirely different course, often with more desirable results. Further variations in reaction course may arise from the use of "rest" periods of relatively long duration between successive energy bursts, during which "rest" periods electrical energy may be substantially absent or of controlled low intensity, or by the use of single bursts followed by appropriate "rest" periods, as above.

By short periods of application of the electrical energy is meant a technique for the application of energy in pulses of microsecond duration. It has been found that the course of the reaction is directly dependent upon the duration of this pulse. In some reactants a pulse of 0.1 microsecond duration will be found advantageous whereas other reactants will require pulses of many microseconds for optimum yield.

When a "rest" period is employed following the application of a pulse the "rest" period is in every instance many times the length of the pulse. Preferably, it will be at least a thousand times the length of the pulse.

During the "rest" period there may be a complete absence of any supply of electrical energy to the reactants, but in some instances it may be desirable to continue, during the "rest" period to supply a relatively low level holding or ionizing energy to the reactants. Such holding or ionizing energy will, if supplied, be far less in strength than the pulse energy but will serve to facilitate the reestablishment of the flow of pulse energy and also facilitate the completion to the desired degree of the reaction initiated by the pulse energy.

The energy applied from electrical sources during the course of the reaction commonly takes the form of electromagnetic radiation induced between an electrode system within the reactor or electromagnetic radiation propagated into space with such directional characteristics that a powerful field is set up within the reactor.

Such a radiation may be supplemented by conduction currents for purposes of control which take the form of electron streams within the reactor and ion currents between the electrodes. The crest or peak potential of the energy dependent upon the particular reactants under treatment will necessarily be such as to impart the necessary energy to the particular reactant or reactants under treatment. In general it will be of the order of hundreds of volts.

It will be appreciated that the wave form or pulse shape is of equal importance to the factors such as crest voltage and pulse shape in directing the course of the reaction.

It is within the scope of this invention to adjust each of the factors discussed above to fit it to the particular reaction which it is desired to perform.

This new process is applicable to many different types of reactions. Reactions selected to illustrate the present invention are the conversion of methane into acetylene, methane into hydrogen, methane into ethane, and methane into ethylene.

A more complete understanding of this invention may be had from the following detailed description when considered with the drawings, in which:

Figure 1 is a diagrammatic illustration of an electronic reactor shown in vertical section;

Figure 2 is a group of curves showing the energy pulse characteristics.

Figure 3 is a diagrammatic illustration of a modified form of electronic reactor shown in vertical section;

Figure 4 is an electrical circuit diagram showing the manner in which energy is supplied to the reactor of Figure 3;

Figure 5 is a diagrammatic illustration of another modification of the electronic reactor shown in vertical section;

Figure 6:
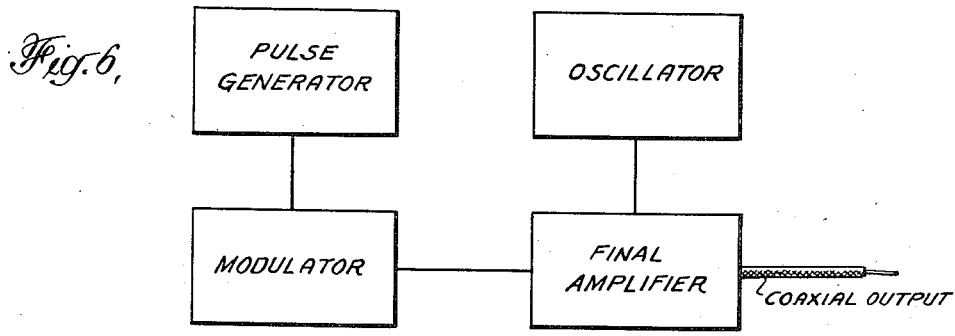
Figure 6 is a schematic block diagram of the elements comprising the pulse generator shown in Figure 5.

Referring to the drawings in detail, particularly Figure 1, there is shown an electronic reactor. The electronic reactor comprises a cylindrical side wall 10 and end closure elements 11 and 12. Elements 11 and 12 may be formed of metal, and element 10 of rubber, glass, quartz, a phenolic condensation product, or any other suitable insulating material. If desirable in certain arrangements this may be reversed. Elements 11 and 12 have secured to their inner faces electrodes 13 and 14 respectively. These electrodes may be formed of brass, copper or other suitable material. Electrical connection is made to the top electrode 13 by means of a conductor 15 that may be a copper or brass pipe or tubing which also serves as a reactant inlet. Interposed between the copper tube 15 and electrode 13 is a funnel shaped link 16 that is also formed of suitable electrical conducting material such as copper or brass. Electrical connection is similarly made to electrode 14 by means of pipe 18, which also serves as a product outlet, and the funnel shaped element 19. Electrodes 13 and 14 are provided with a plurality of holes 20 which serve as passageways through which reactants in gaseous state are admitted to and products discharged from the reaction zone 17. The vertical spacing of electrodes 13 and 14 is a function of potential, pressure and reactants.

Electrical power in the form of pulses is supplied to the electrodes 13 and 14 by means of a condenser 21 which is connected across them by conductors 22 and 23. The capacity of condenser 21 is quite low and may range from .05 to 5 microfarads. Condenser 21 is continually charged through the resistance 24 and conductors 25 and 26 by a direct current power source not shown. The direct current voltage of the power source may range from 400 to 4000 volts.

A striking electrode 27 is shown suspended from the top electrode 13. Striking electrode 27 is a small inductance formed of a material such as that known by the trade name "Nichrome" and functions to reduce the voltage required to initiate a discharge between the electrodes 13 and 14. By making the striking electrode 27 in the form of an inductance there will not be an appreciable current drain from electrode 13 which would tend to reduce the discharge voltage between the main electrodes 13 and 14.

Although the use of electrode 27 is desirable the apparatus can be successfully operated without it. Additionally in some instances the condenser 21 can be eliminated by regulating the capacity formed by the electrodes 13 and 14.

The characteristics of the electrical pulses supplied to the electrodes 13 and 14 are shown in Figure 2. Curve I, which represents the variation of current flow from condenser 21 with time, is in the form of successive pulses. The time between pulses, or repetition time, is determined by the voltage of the power supply and resistance 24. The amplitude of the current pulse is determined by the potential applied to the condenser and the reactance of the electrode circuit during the discharge.

An examination of the current pulse when placed on a cathode ray oscilloscope disclosed that there is superimposed thereon a current of radio frequency as shown in the curve marked R. F.

Curve E of Figure 2 has been plotted with electrode voltage as ordinates and time as abscissae. The electrode voltage represents instantaneous values of charged potential of condenser 21.

Obviously the device of Figure 1, by a proper selection of materials for items 10, 11 and 12, may be built to withstand any desired internal pressure.

In the operation of the above described apparatus a reactant such as methane in gaseous state is caused to flow slowly into the reaction chamber through the inlet 15 and traverse the reaction zone between the electrodes 13 and 14 while pulse discharges are occurring between the electrodes. The energy pulses cause the methane to be converted into other products which are drawn off through the outlet 18.

An example of such reactions is as follows:

*Methane-acetylene reaction*

| | |
|---|---|
| Run number | EP169 |
| Gas pressure, mm. Hg | 1.0 |
| Gas inlet temp., °F | 90 |
| Crest voltage | 4000 |
| Repetition interval, millisec | 50 |

| Product Analysis | Volume Per Cent (Mole Per Cent) | Weight Per Cent |
|---|---|---|
| Methane | 3.7 | 8.4 |
| Hydrogen | 77.8 | 22.3 |
| Acetylene | 17.5 | 65.2 |
| Ethylene | 0.6 | 2.4 |
| Ethane | 0.4 | 1.7 |
| Propane | | |
| Nitrogen | | |
| Total | 100.0 | 100.0 |
| *Estimated Conversion CH₄ Recycled to Extinction* | | |
| H₂ and C₂ Fraction | | 77% |
| Heavy Polymers | | 23% |

The above results were obtained from a single pass through the reactor. Substantially complete conversion can be effected by recycling the unconverted methane.

The effect of changing the variables of the reactor on the above reaction is illustrated by the following tabulated results:

| (1) | (2) | (3) | (4) | (5) | (6) | (7) | (8) | (9) | (10) | (11) | (12) |
|---|---|---|---|---|---|---|---|---|---|---|---|
| Sample No. | H₂/C₂H₂ | Per Cent CH₄ Conv. | Per Cent H₂ | Per Cent C₂H₂ | Yield | Reaction Path Length | Pk. Kw. | PD | Rep. Rate | Pulse μ sec. | Rest μ sec. |
| | | | | | | Inches | | | | | |
| 225 | 5.26 | 30.4 | 18.3 | 3.5 | 11.5 | ¾ | 250 | 56 | 340 | 3 | 2,940 |
| 226 | 54.78 | 59.5 | 55.3 | 1.0 | 1.7 | ¾ | 116 | 16 | 500 | 3 | 1,970 |
| 228 | 4.41 | 15.1 | 10.6 | 2.4 | 15.9 | ¾ | 156 | 50 | 400 | 4 | 2,496 |
| 230 | 3.78 | 72.6 | 55.7 | 14.8 | 20.4 | 2 | 218 | 90 | 400 | 4 | 2,496 |
| 232 | 4.10 | 94.8 | 75.5 | 18.4 | 18.7 | 2 | 375 | 20 | 200 | 4 | 4,996 |
| 233 | 3.81 | 95.0 | 75.4 | 19.1 | 20.1 | 2 | 325 | 20 | 200 | 5 | 4,445 |
| 236 | 5.93 | 97.7 | 82.5 | 13.9 | 14.2 | 4 | 50 | 20 | 100 | 5 | 9,995 |
| 237 | 4.49 | 93.7 | 75.2 | 16.7 | 17.8 | 4 | 29 | 20 | 100 | 5 | 9,995 |
| 238 | 9.86 | 99.0 | 89.4 | 9.1 | 9.2 | 4 | 53 | 20 | 150 | 5 | 6,662 |
| 239 | 4.45 | 45.3 | 35.6 | 8.0 | 17.7 | 1½ | 38 | 44 | 165 | 5 | 6,061 |
| 240 | 4.04 | 45.0 | 34.7 | 8.6 | 19.1 | 1 | 180 | 84 | 240 | 8 | 4,158 |
| 241 | 4.69 | 95.3 | 77.8 | 16.6 | 17.4 | 3 | 148 | 30 | 160 | 10 | 6,227 |

More complete identification of the above columns is as follows:

(1) Sample No.—number of sample that was analyzed by mass spectrometer.

(2) H₂/C₂H₂—a ratio by volume of hydrogen formed to acetylene in the product stream (theoretically 3 to 1).

(3) Percent CH₄ conv.—percent of methane converted.

(4) Percent H₂—volume percent of hydrogen in product stream.

(5) Percent C₂H₂—volume percent of acetylene in product stream.

(6) Yield—calculated yield on recycle basis.

(7) Reaction path length — reaction path length.

(8) Pk. kw.—peak power in kilowatts.

(9) PD—pressure in mm. of mercury multiplied by electrode spacing in centimeters.

(10) Rep. rate—pulse repetition rate per second.

(11) Pulse μsec.—length of pulse in microseconds.

(12) Rest μsec.—rest duration between pulses in microseconds.

Although the above reaction was carried out at the indicated pressure experiments show that the process is operable up to and as much as two atmospheres above atmospheric pressure.

A modified form of electronic reactor is shown in Figure 3. This reactor comprises a base 27 on which is mounted a jacket or hood 28. Hood 28 forms with base 27 a pressure seal. A gas inlet pipe 29 passes through the base 27 at 30 and connects to a manifold block 31 carried by the base 27. Manifold 31 is provided with a single inlet passageway 32, which registers with the pipe 29, and a plurality of outlet passageways 33 which serve to distribute reactants introduced into the primary stage of the reactor.

Supported on manifold 31 are a series of electrodes 34, 35, 36 and 37 which are vertically separated by insulators 38, 39, 40 and 41, which also serve to direct the flow of gas through the passageways 42 formed in the electrodes 34 to 37, and through the reaction zones 43 to 46 inclusive. The reaction products which are collected in the space 47 flow from the reactor through the outlet pipe 48.

Electrodes 34 to 37 inclusive may be formed of brass, copper, or other electrical conductive material.

Electrical connection is made to the electrodes 34 to 37 by means of conductors 48, 49, 50 and 51, which extend from outside the reactor through openings 52 in the base which are provided with insulating bushings 53, 54, 55 and 56.

The electrical circuit diagram for supplying power to electrodes 34 to 37 is shown in Figure 4. The electrical circuit for this form of reactor is similar to that used in connection with the reactor of Figure 1, differing only in that the electrodes S1 to S6 themselves form the capacity. Alternate electrodes are connected together to form two groups of electrodes. One group, comprising electrodes S2, S4 and S6, is connected to one side of the power source not shown by conductor 57 and to ground at 58. The other side of the power supply is connected to each of the electrodes S1, S3 and S5 of the other group through conductors 62, 63 and 64, resistances 59, 60 and 61, and inductances 65, 66 and 67.

The source of power may be direct current of from 400 to 4000 volts, or resistors 59, 60 and 61 may be connected to an alternating current 3 phase Y, the neutral of which is grounded at 58.

Inductances 65, 66 and 67 serve to control the rate of potential rise across the electrodes effecting a reduction in power loss over that which would be effected if resistors alone were employed.

When using direct current power the pulses are of the same character as those illustrated in connection with the reactor of Figure 1. This design permits the achievement of higher operating frequencies through the use of smaller capacities and a reduction in the direct current resistance of the discharge current path.

When using alternating current power the action is similar except that the discharge is forced to occur at a frequency which is a harmonic of the power supply frequency and that when high repetition rates are employed the supply voltage will vary at the supply frequency.

The pulse characteristics are controlled in the same manner as that described in connection with the reactor of Figure 1.

In the operation of the form of reactor shown in Figure 3 a reactant such as methane in gaseous state is admitted to the reactor through pipe 29 and manifold 31 and is caused to pass upwardly through the passageways in the electrodes thereby traversing the successive reaction zones while energy pulses are being fed to the electrodes to produce a discharge between electrodes. In the reaction zones the methane is converted into other products.

An example of a reaction carried out in this type of reactor is as follows:

*Methane—hydrogen reaction*

| Run number | EP 184 |
|---|---|
| Gas pressure, mm. Hg | 1.5–2 |
| Gas inlet temp., °F | 90 |
| Crest voltage | 350 |
| Repetition interval, milliseconds | 0.002 |

|  | Volume Per Cent (Mole Per Cent) | Weight Per Cent |
|---|---|---|
| Methane | 46.8 | 70.03 |
| Hydrogen | 45.0 | 8.42 |
| Acetylene | 1.9 | 4.62 |
| Ethylene | 0.9 | 2.36 |
| Ethane | 2.3 | 6.45 |
| Nitrogen | 3.1 | 8.12 |
| High Boiling Material Condensed |  |  |

The above results show approximately 50% conversion of methane to hydrogen in a single pass. Obviously by recycling the unconverted methane greater yield can be obtained.

The potential and pressure ranges employed are essentially those described in connection with the reactor of Figure 1.

Still another embodiment of an electronic reactor is shown in Figure 5. This form of reactor comprises an outer cylindrical housing 68 formed of an electrical conducting material. Housing 69 also serves as one electrode of the reactor. An inner cylindrical electrode 69 is concentrically spaced from the outer electrode. These two electrodes define a reaction zone 70 into which reactants are admitted in gaseous state through the inlet pipe 71 located near the bottom of the outer electrode 68. A product outlet 72 is located near the top of the reactor as shown.

Direct current potential from a source not shown is applied across the electrodes by means of conductors 73, 74, resistance 75, conductor 76, the coaxial cable 77, and the tapered link 78. This potential may range from 50 to 4000 volts. The reason for the wide range of voltage will become apparent as the description proceeds.

The reactor of Figure 5 as described to this point will operate successfully in the manner pointed out in connection with the reactors of Figures 1 and 3. However, such operation requires a substantial potential across the electrodes to produce the desired discharge. In order to overcome this undesirable feature means are provided for supplying a high voltage pulse having a definite repetition rate to the electrodes to initiate the discharge. The pulse generator is shown in Figure 5 as a block 79. Since pulse generators suitable for this purpose are well known in the art and no novelty is claimed for it, it will not be described in detail.

Figure 7:
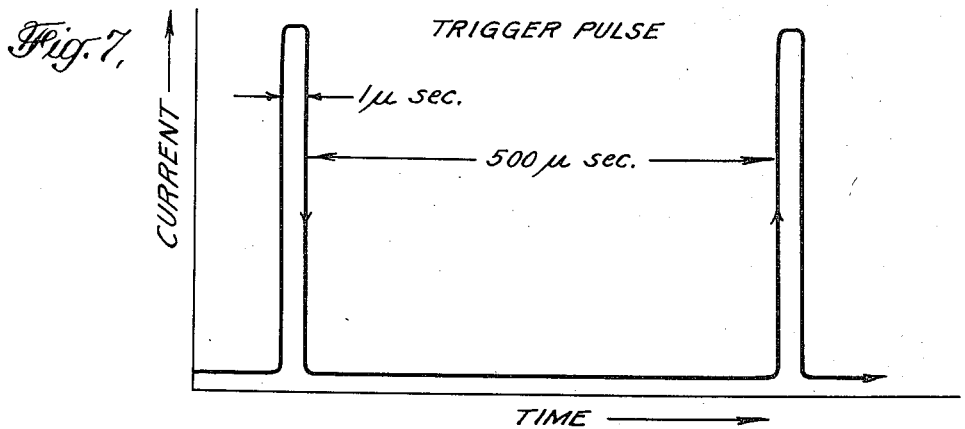
Figure 7 is a current-time curve showing a square wave pulse that is suitable for use in applying energy to the reactor.
Figure 8:
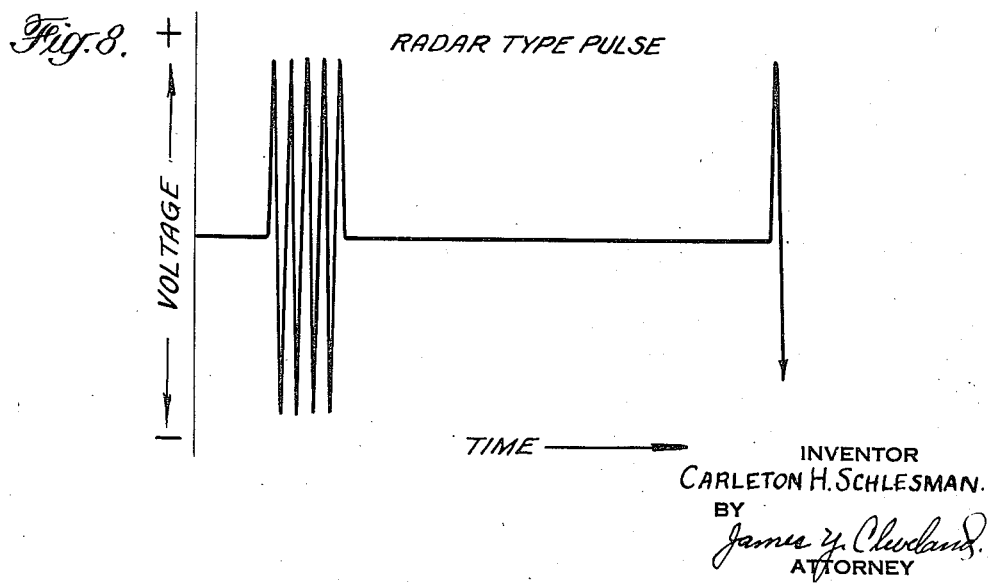
Figure 8 is a voltage-time curve showing a radar type pulse.

The pulses produced by the generator 79 may be of the form shown in Figure 7 or they may take the form of radar pulses as shown in Figure 8. Although the pulses of Figure 7 are shown of a single polarity it is obvious that alternate pulses can be of opposite polarity. When radar type pulses are used the generator 79 may comprise the elements indicated in the block diagram of Figure 6.

As pointed out above these pulses, which are conducted to the electrodes of the reactor through the coaxial cable 80, direct current isolation condenser 81 and the tapered link 78, may be used merely to initiate the discharge between electrodes. Once a few ions are formed in the reaction zone a lower direct current voltage will supply the energy for the reaction. In this case the crest voltage of the pulse generator must be several times that of the direct current supply.

When using high frequency radar pulses of the type illustrated in Figure 8 a careful impedance match must be made between the coaxial transmission line 80 and the electrodes 68 and 69. To effect a proper match the top of the housing 68 is preferably tapered such that the tapered portion is several wave lengths long. A corresponding taper which varies in the amount of taper, depending upon the impedance match sought, is given to the connecting link 78. The terminating impedance, that is, the load is chosen to give the optimum utilization of radio frequency energy and to achieve the desired reaction.

The flexibility of the system illustrated in Figure 5 makes a further mode of operation possible. The direct current potential can be entirely removed and all of the reaction energy, in the form of pulses, supplied by the pulse generator 79. This mode of operation is advantageous in carrying out certain types of reactions in which it is desired to follow the short period of time during which energy is supplied to the reaction by a rest period of predetermined length.

A still further mode of operation is desirable for certain types of reactions. The major portion of the energy for the reaction can be furnished by the pulse generator 79 and a small direct current holding voltage supplied from the direct current source. The direct current holding voltage will function to maintain a continuous discharge between pulses which it is believed prevents recombination of the ions formed during the high energy pulse or controls the rate of recombination.

Examples of reactions carried out with the reactor of Figure 5 are as follows:

Run number _____ EP 160
Gas pressure, mm. Hg_____ 1.0
Gas inlet temp., °F_____ 90
Crest voltage _____ 350
Repetition interval, milliseconds_____ 5.5

|  | Volume Per Cent (Mole Per Cent) | Weight Per Cent |
|---|---|---|
| Methane | 67.7 | 78.28 |
| Hydrogen | 23.4 | 3.38 |
| Acetylene | 2.1 | 3.94 |
| Ethylene | 2.5 | 5.00 |
| Ethane | 4.3 | 9.32 |
| Total | 100 | 99.92 |

Run number _____ EP 161
Gas pressure, mm. Hg_____ 1.0
Gas inlet temp., °F_____ 90
Crest voltage _____ 350
Repetition interval, milliseconds_____ 133

|  | Volume Per Cent (Mole Per Cent) | Weight Per Cent |
|---|---|---|
| Methane | 68.9 | 79.88 |
| Hydrogen | 22.9 | 3.31 |
| Acetylene | 2.3 | 4.33 |
| Ethylene | 2.5 | 5.07 |
| Ethane | 3.4 | 7.39 |
| Total | 100 | 99.98 |

The above examples are the results of a single "pass" through the reactor. The yield of products can be enhanced by recycling a part or all of the discharge products, or in a manner well known in the art, separation of the products can be effected and the unreacted methane recycled. This feature is in part illustrated in Figure 5 in which a recycling pump 82 connected in the tube or pipe line 83 may feed discharge products from the reactor to the inlet 71 by the proper manipulation of the valves 84 and 85.

Another example of a chemical reaction which has been carried out in a reactor of the general type as those described above is as follows:

Run number _____ EP 324
Gas pressure, mm. of mercury_____ 110
Gas inlet temp., °F_____ 90
Crest voltage_____ 5000
Repetition rate per second_____ 1900
Length of pulse in microseconds_____ 1.0

Volume per cent (mole per cent)
Hydrogen _____ 69.5
Ethane _____ .2
Ethylene _____ .9
Acetylene _____ 12.0
Nitrogen _____ 1.1
Methane _____ 16.3

It is to be understood that the present invention is not to be limited to the specific examples recited above but has broad application in the chemical field.

I claim:

1. A method of converting methane into lower molecular weight hydrocarbons that comprises subjecting the methane to a succession of pulses of ionizing electrical energy, each of said pulses having a substantially square wave form and a duration of from 0.1 to 2500 microseconds and followed by a rest period of substantially greater duration.

2. A method of converting methane into lower molecular weight hydrocarbons that comprises subjecting the methane to a succession of pulses of ionizing electrical energy, each pulse having a duration of from 0.1 to 2500 microseconds followed by a rest period of substantially greater duration.

3. A method of converting methane into lower molecular weight hydrocarbons that comprises subjecting the methane to a succession of pulses of ionizing electrical energy, each of said pulses having a wave form of high frequency and a duration of from 0.1 to 2500 microseconds and followed by a rest period of substantially greater duration.

4. A method of converting hydrocarbons in the gas phase that comprises subjecting the hydrocarbons while in the gas phase to a succession of pulses of ionizing electrical energy, each pulse having a duration of from 0.1 to 2500 microseconds followed by a rest period of substantially greater duration.

CARLETON H. SCHLESMAN.

REFERENCES CITED

The following references are of record in the file of this patent:

UNITED STATES PATENTS

| Number | Name | Date |
|---|---|---|
| 1,570,209 | De Brey | Jan. 19, 1926 |
| 1,838,374 | Eddy | Dec. 29, 1931 |
| 1,977,155 | Stadler et al. | Oct. 16, 1934 |
| 2,000,224 | Eisenhut | May 7, 1935 |
| 2,072,917 | Woelflin | Mar. 9, 1937 |
| 2,080,933 | Rose | May 18, 1937 |
| 2,096,774 | Wolfe | Oct. 26, 1937 |
| 2,105,614 | Roberts | Jan. 18, 1938 |
| 2,257,177 | Luster | Sept. 30, 1941 |
| 2,279,583 | Slayter | Apr. 14, 1942 |
| 2,353,770 | Suits | July 18, 1944 |

FOREIGN PATENTS

| Number | Country | Date |
|---|---|---|
| 296,355 | Great Britain | May 2, 1929 |